US 6,529,963 B1

United States Patent
Fredin et al.

(12) United States Patent
Fredin et al.

(10) Patent No.: US 6,529,963 B1
(45) Date of Patent: Mar. 4, 2003

(54) METHODS AND APPARATUS FOR INTERCONNECTING INDEPENDENT FIBRE CHANNEL FABRICS

(75) Inventors: Gerald J. Fredin, Wichita, KS (US); William V. Courtright, II, Pittsburgh, PA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/222,054

(22) Filed: Dec. 29, 1998

(51) Int. Cl.$^7$ .............................................. G06F 13/00
(52) U.S. Cl. .......................... 710/1; 703/21; 709/227; 710/68; 710/129; 710/130
(58) Field of Search ................. 710/130, 129, 710/681; 703/21; 709/227

(56) References Cited

U.S. PATENT DOCUMENTS

| | | | |
|---|---|---|---|
| 4,748,617 A | 5/1988 | Drewlo | 370/85 |
| 5,077,727 A | 12/1991 | Suzuki | 359/123 |
| 5,130,836 A | 7/1992 | Kaharu et al. | 359/152 |
| 5,425,028 A | 6/1995 | Britton et al. | 370/94.1 |
| 5,473,599 A | 12/1995 | Li et al. | 370/16 |
| 5,541,914 A | 7/1996 | Krishnamoorthy et al. | 370/56 |
| 5,544,162 A | 8/1996 | Mraz et al. | 370/60 |
| 5,592,472 A | 1/1997 | Grant et al. | 370/351 |
| 5,617,422 A | 4/1997 | Litzenberger et al. | 370/401 |
| 5,764,961 A | * 6/1998 | Bhat | 703/21 |
| 5,819,115 A | * 10/1998 | Hoese et al. | 710/68 |
| 6,065,087 A | * 5/2000 | Keaveny et al. | 710/129 |
| 6,240,482 B1 | * 5/2001 | Gates et al. | 710/130 |
| 6,327,621 B1 | * 12/2001 | Lee et al. | 709/227 |

OTHER PUBLICATIONS

Pung et al., Fibre Optical Local Area Networks with Arbitrary Topology, IEE Coloquium (Digest), 1983.
Kaminow, Ivan, P., Photonic Multiple–Access Networks: Topologies, AT&T Technical Journal, Mar./Apr., 1989.
Marsh, James, Bringing FDDI to Market, Photonics Spectra, vol. 23, No. 7, Jul. 1989.
Haas, Zygmunt, Blazelan: A Photonic Local–Area Network for Distributed and Parallel Processing, IEEE Global telecommunications Conference and Exhibition, Vol. 2, 1989, p. 994–998.
Kvaren et al., Communications Between LANs Much More Usual in the 90s; Tele (Swedish Edition), No. 2, 1990.
Fujiyama et al., ATM Switching System Evolution and Implementation for B–ISDN, Supercomm ICC '90 Conference Record–International Conference on Communications, vol. 4, 1990, p. 1577–1583.
Stephens, Gary R., The Other Fiber, The Other Fabric, The Other Way, Proceedings of SPIE–The International Society for Optical Engineering, vol. 1784, 1993, p. 42–52.

* cited by examiner

Primary Examiner—Jeffrey Gaffin
Assistant Examiner—Mohammad O. Farooq
(74) Attorney, Agent, or Firm—Suiter & Associates P.C.

(57) ABSTRACT

A system for interconnecting a plurality of interdependent fiber channel loops or fabrics. The system preferably comprises a first server which includes a PCI bus and a fibre channel to PCI bus adapter for each one of the plurality of the independent fibre channels. Each fibre channel to PCI bus adapter is configured to connect one of the plurality fibre channels to the PCI bus at the first server. The plurality of independent fibre channels then communicate with each other across the PCI bus of the first server utilizing the intelligent I/O (I$_2$O) routing of the fibre channel to PCI bus adapters. The plurality of fibre channels are configured to communicate with the other fibre channels, as well as the first server via the PCI bus. This system can be configured such that any one of the plurality of fibre channels can include one or more devices connected thereto in addition to the first server. Each device connected to one of the plurality fibre channels is configured to communicate with one or more devices connected to the other fibre channels across the PCI bus of the first server. The devices connected to the fibre channel may comprise, inter alia, other servers, storage systems, or other suitable computer systems or peripherals.

43 Claims, 7 Drawing Sheets

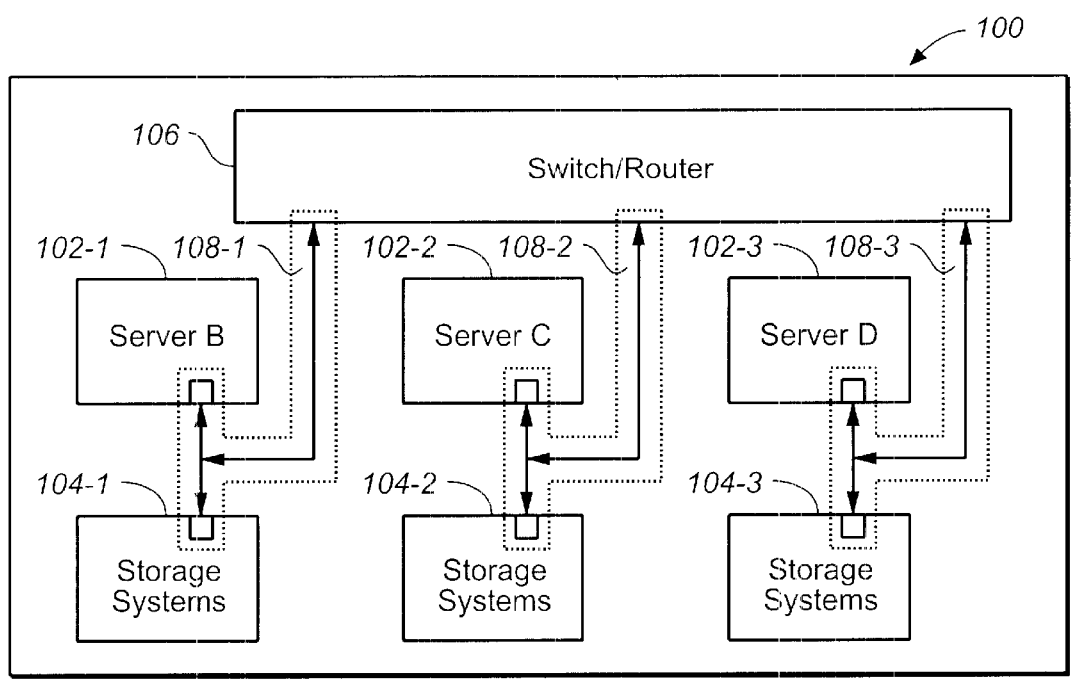
FIG._1
*(PRIOR ART)*

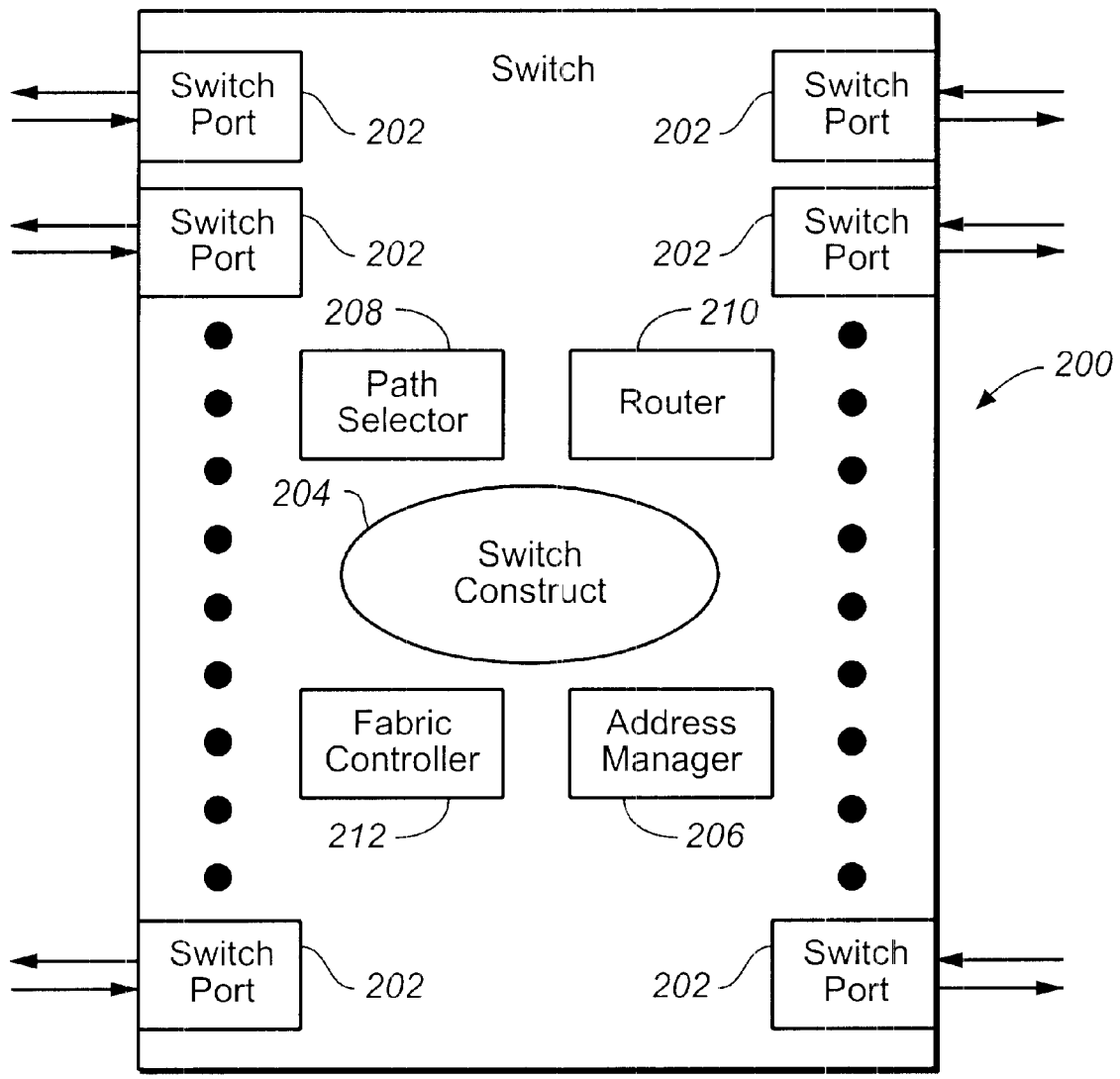
FIG._2
*(PRIOR ART)*

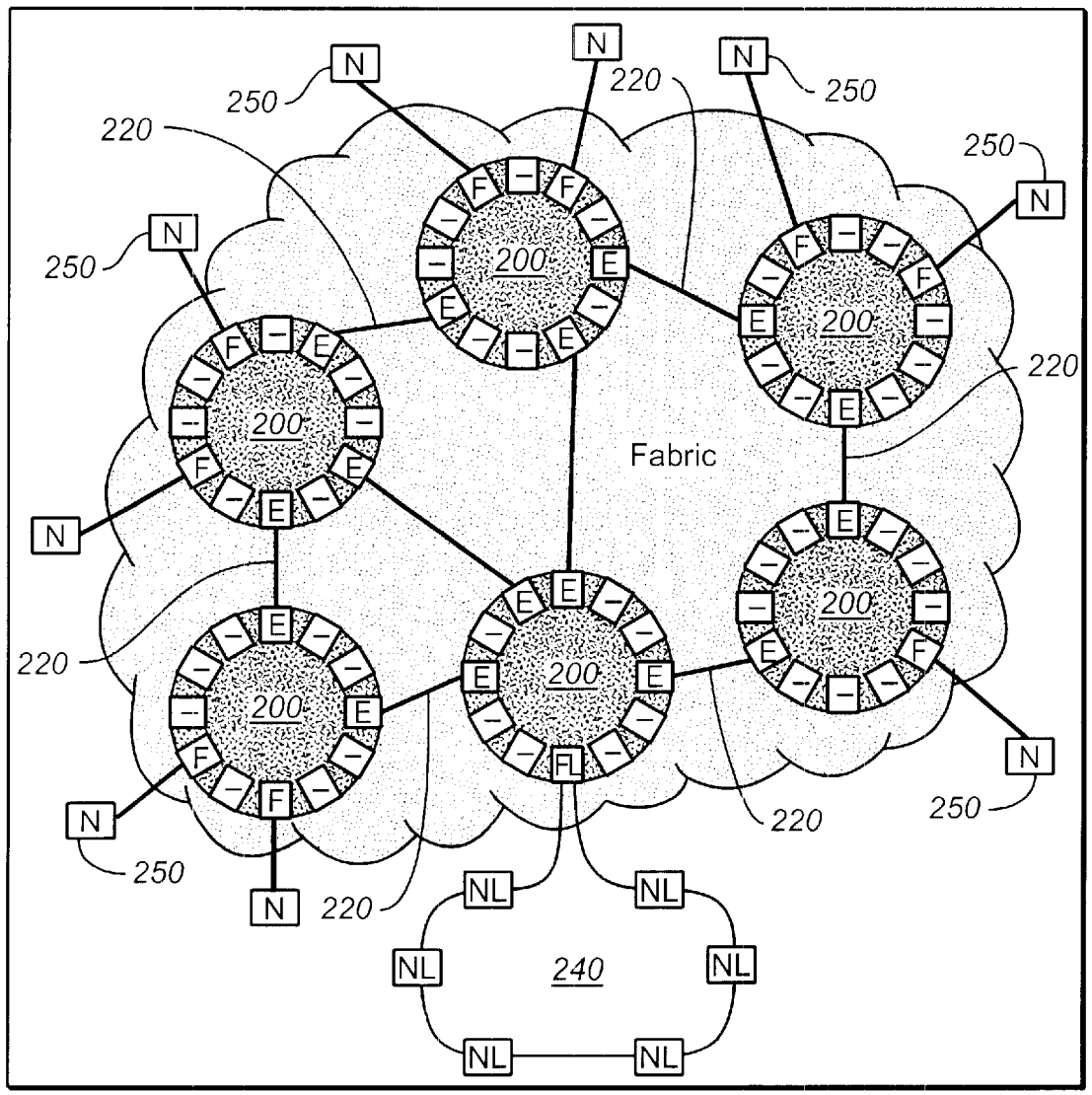
FIG._3

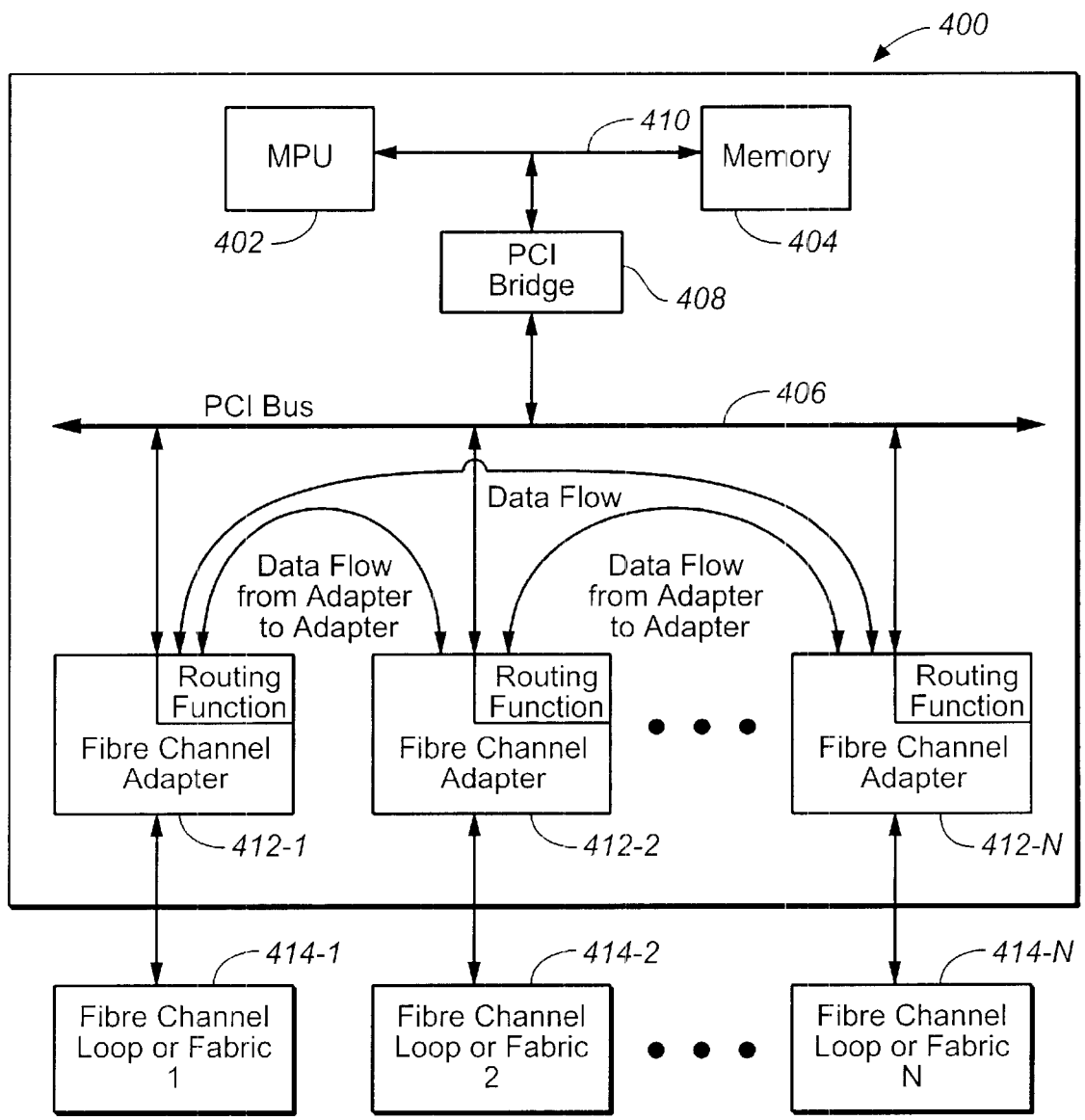
FIG._4

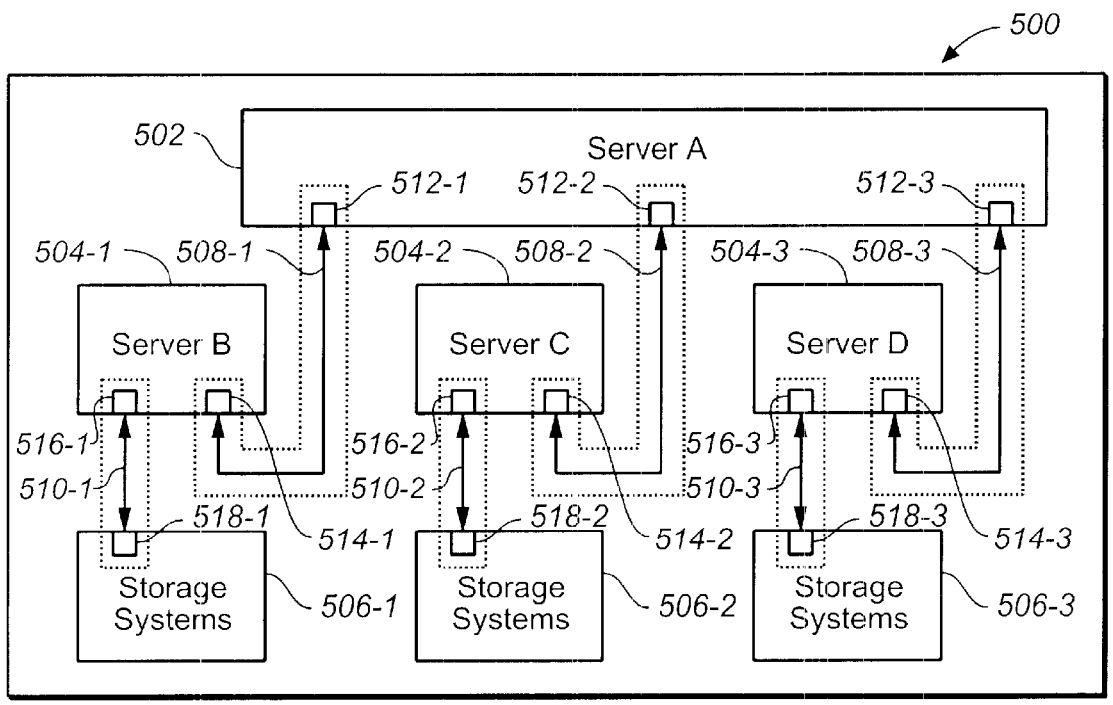
FIG._5
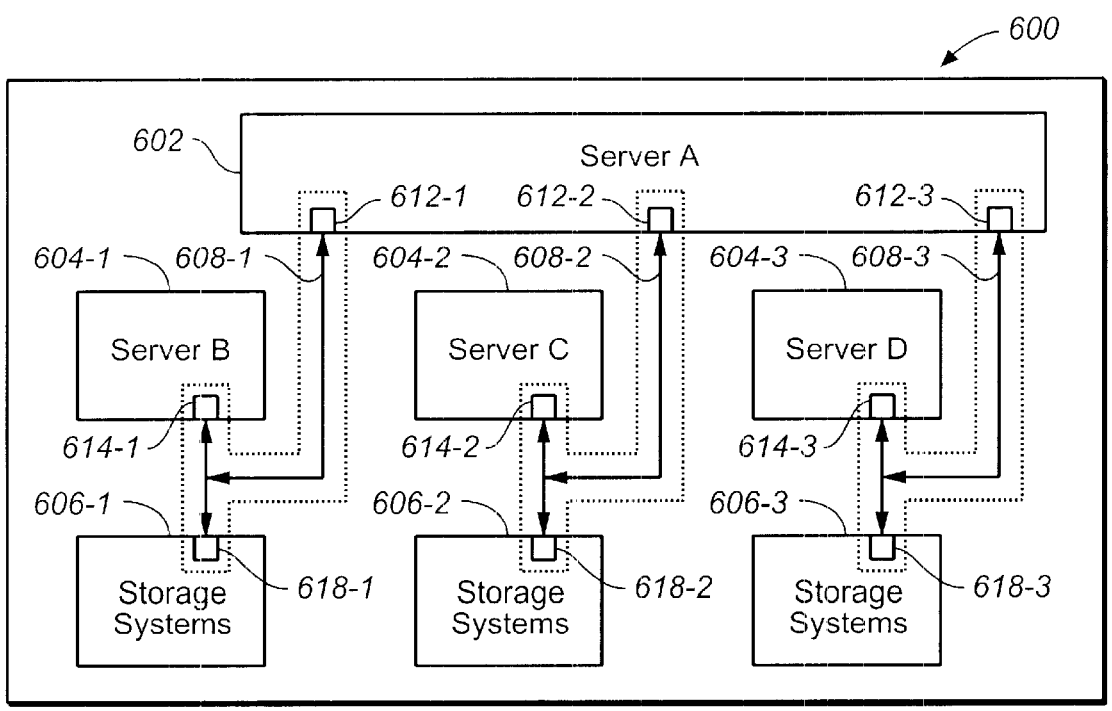
FIG._6

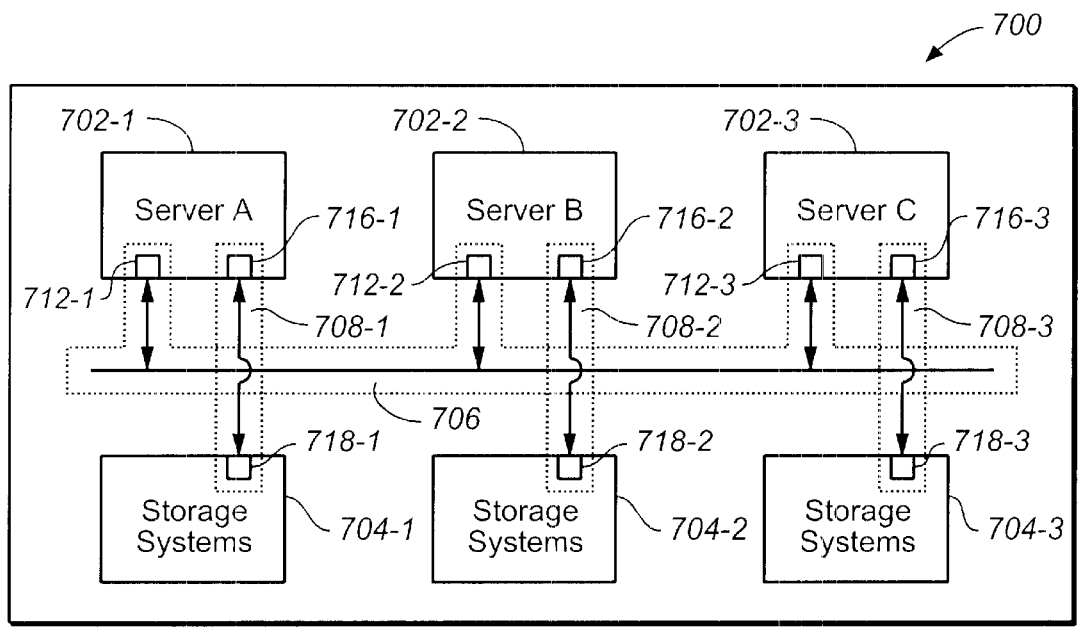
FIG._7
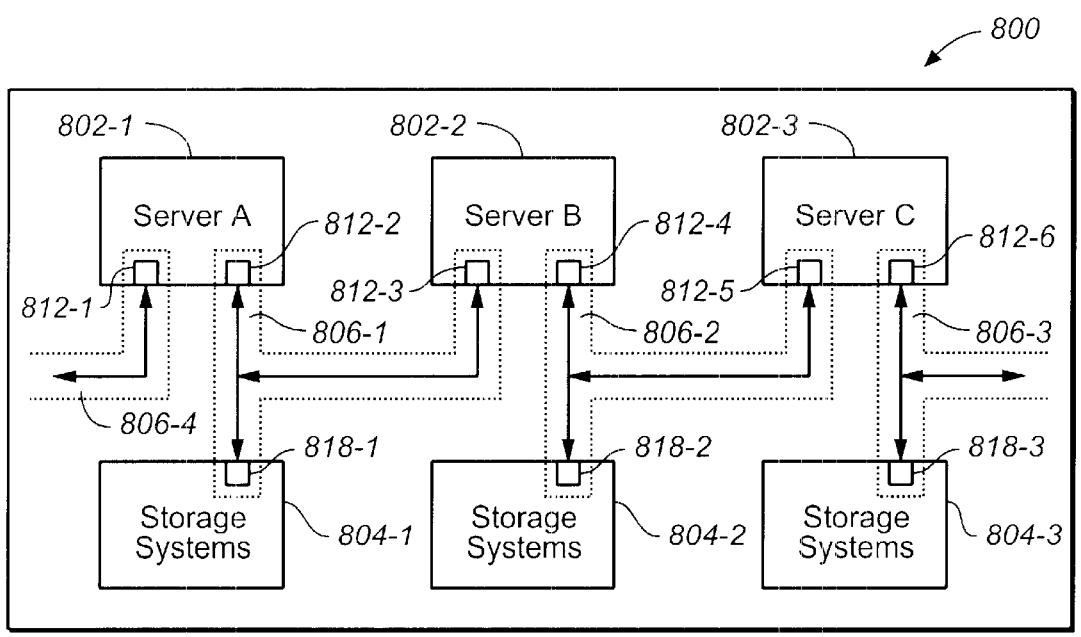
FIG._8

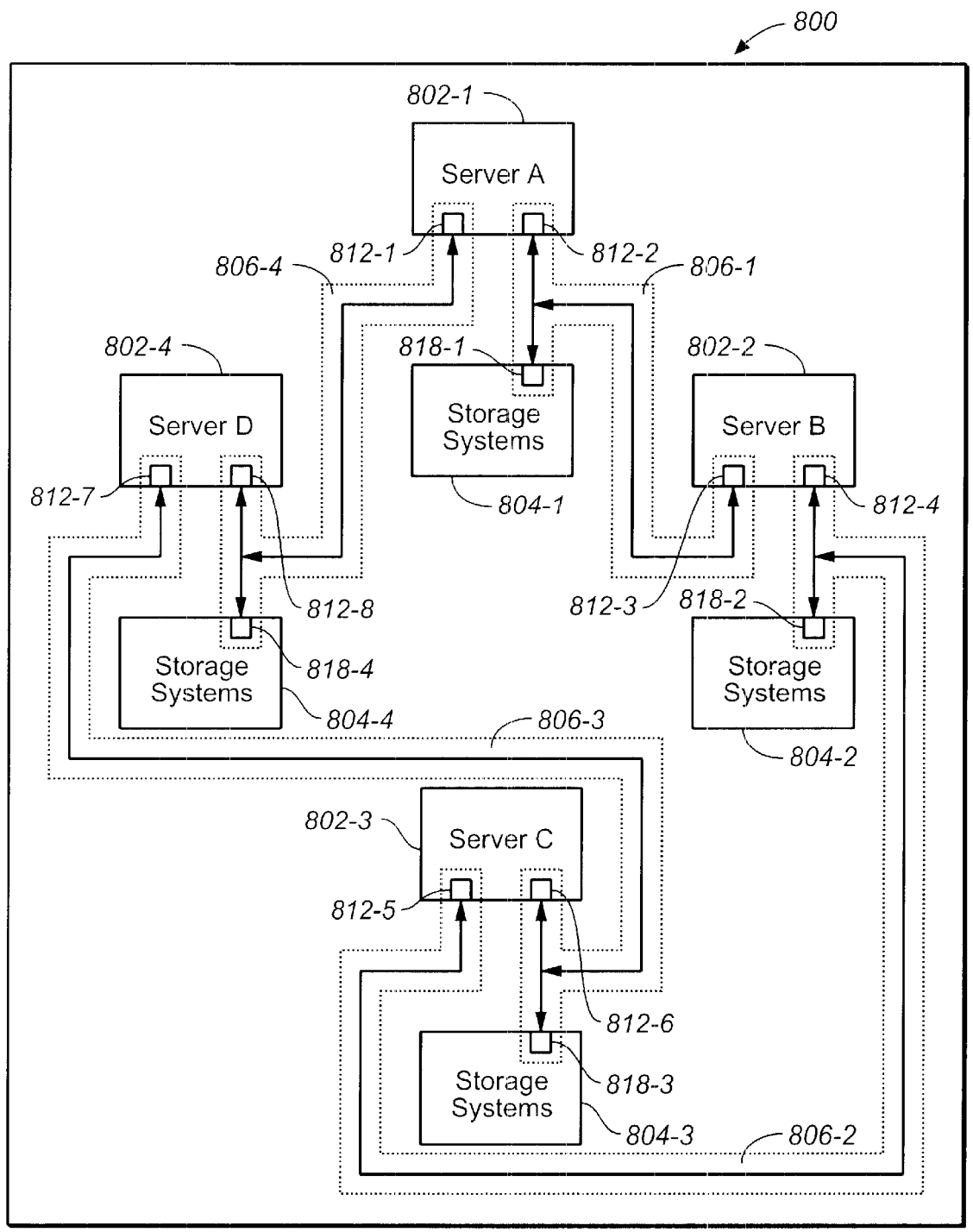
FIG._9

METHODS AND APPARATUS FOR INTERCONNECTING INDEPENDENT FIBRE CHANNEL FABRICS

BACKGROUND OF THE INVENTION

The present invention relates generally to methods and apparatus for interconnecting independent fibre channel loops and/or fabrics, and more particularly to methods and apparatus for interconnecting fibre channel loops or fabrics using intelligent fibre channel adapters.

Fibre channel has emerged as the high speed serial technology of choice for server-storage connectivity. Fibre channel has a number of advantages over SCSI. For example, fibre channel offers higher speed than SCSI: the base speed is about 100 megabits per second in each direction, which is likely to increase to 200, 400 and 800 megabits per second. In full duplex mode, these speeds are doubled. In addition, many of the fibre channel devices are dual ported, i.e., can be accessed through two independent ports, which doubles speed and increases fault tolerance capabilities. Fibre channel network cables can be as long as 30 meters (coaxial) or 10 kilometers (optical) fibre channel enables self-configuring and hot swapping of devices, and the maximum number of devices on a single port can be as high as 126. Finally, fibre channel provides software compatibility with SCSI.

In current fibre channel configurations, I/O requests which originate from a client or server device on one fibre channel loop or fabric must pass through a switch or router to get from the client or server initiating the I/O request on the one fibre channel loop or fabric to a storage system, server, or client residing on a different independent fibre channel fabric or loop.

As illustrated in FIG. 1, a typical storage system network 100 is illustrated. In the illustrated system, network 100 comprises a plurality of servers, 102-1, 102-2, and 102-3. In addition, connected to each server is a storage system 104. As illustrated in FIG. 1, storage system 104-1 is connected to server 102-1 via fibre channel loop or fabric 108-1. Similarly, storage system 104-2 is connected to server 102-2 via fibre channel loop or fabric 108-2, and storage system 104-3 is connected to server 102-3 via fibre channel loop or fabric 108-3. Each fibre channel loop or fabric 108 also is attached to fibre channel switch 106 which routes I/O's between the independent fibre channels 108, and in particular, the devices on fibre channels 108. For example, if server 102-1 issues an I/O request directed to one of the other servers 102-2 or 102-3 or storage system 104-2 or 104-3 not attached to fibre channel 108-1, the I/O request must pass through switch 106, which determines the destination of the I/O request, and then passes the I/O to the destination fibre channel, and ultimately the I/O device residing on the fibre channel.

Referring now to FIG. 2, a typical fibre channel switch 200 is illustrated. Switch 200 comprises a plurality of switch ports 202 which interface with fibre channel nodes, fibre channel arbitrated loops, or other fibre channel switches. Switch 200 further comprises a switch construct which is capable of multiplexed frame switching, circuit switching or both. Switch 200 also includes an address manager 206, a path selector 208, a router 210, and a fabric controller 212.

Address manager 206 typically is responsible for the assignment of addresses within some portion of the fibre channel fabric. Within switch 200, address manager 206 is responsible for acquiring a Domain and Area for the switch, and allocating Port-IDs within the Domain and Area. Path selector 208 is a logical entity that establishes frame routing paths, and router 210 is a logical entity that performs the routing of frames to their final destination. Finally, fabric controller 212 is a logical entity that performs the management of switch 200.

Switches 200 may be joined freely or in a structured fashion to form a larger fabric, as illustrated in FIG. 3. That is, switches 200 may connect to other switches in the fibre channel fabric via interswitch links 220, forming a large fibre channel fabric configuration. In addition, the switches can connect independent fibre channel loops 240 and individual fibre channel nodes 250 to the larger fibre channel fabric, as well as other fibre channel loops 240 and nodes 250.

The problem with the current method and apparatus for interconnecting independent fibre channels is that individual switches can cost $25,000 or more. When an organization is trying to interconnect multiple fabrics, the cost of the switches can become extremely expensive. Therefore, it would be beneficial to be able to connect independent fibre channel fabrics or loops using means other than expensive switches.

SUMMARY OF THE INVENTION

Accordingly, it is an advantage of the present invention to provide methods and apparatus for interconnecting independent fibre channel fabrics which overcome the shortcomings of the prior art.

Another advantage of the present invention is that the methods and apparatus for interconnecting fibre channel fabrics utilizes an intelligent I/O ("I$_2$O") fibre channel to PCI bus adapter to facilitate I/O communications between the independent fibre channels through a computer having a PCI bus.

Yet another advantage of the present invention is that the methods and apparatus for interconnecting independent fibre channels use I$_2$O peer-to-peer technology to determine whether the I/O is destined for a local system or a system residing on a different fibre channel loop or fabric.

Yet another advantage of the present invention is that the methods and apparatus for interconnecting independent fibre channel fabrics or loops can be configured in a centralized or a distributed router configuration.

The above and other advantages of the present invention are carried out in one form by a system for interconnecting a plurality of independent fibre channel loops or fabrics comprising a first server including a PCI bus and a fibre channel to PCI bus adapter for each one of the plurality of independent fibre channels. Each fibre channel to PCI bus adapter is configured to connect one of the plurality of fibre channels to the PCI bus of the first server. The plurality of independent fibre channels then can communicate with each other across the PCI bus of the first server utilizing the intelligent I/O (I$_2$O) routing of the fibre channel to PCI bus adapters. Each of the plurality of fibre channels are configured to communicate with the other fibre channels, as well as the first server via the PCI bus.

The system can be configured such that any one of the plurality of fibre channels can include one or more devices connected thereto in addition to the first server. Each device connected to one of the plurality of fibre channels is configured to communicate with one or more devices connected to another one of the plurality of fibre channels across the PCI bus of the first server. The devices connected to the fiber channels may comprise, inter alia, other servers, storage systems, or any other suitable computer system or peripheral.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

FIG. 1 is a block diagram of a prior art fibre channel network system using a switch or router to communicate between independent fibre channel loops or fabrics;

FIG. 2 is a block diagram of a prior art fibre channel switch or router;

FIG. 3 is a network diagram of a typical fibre channel network configuration;

FIG. 4 is a block diagram of a computer having a PCI bus and a plurality of fibre channel to PCI bus host adapters for routing network requests between independent fibre channel loops or fabrics;

FIG. 5 is a block diagram of one embodiment of a fibre channel network utilizing computers having fibre channel host adapters as illustrated in FIG. 4;

FIG. 6 is a second embodiment of a fibre channel network utilizing computers having fibre channel to PCI bus host adapters as illustrated in FIG. 4;

FIG. 7 is a third embodiment of a fibre channel network utilizing, computers having fibre channel to PCI bus host adapters as illustrated in FIG. 4;

FIG. 8 is a fourth embodiment of a fibre channel network utilizing a computer having fibre channel to PCI bus host adapters as illustrated in FIG. 4; and FIG. 9 is a fifth embodiment of a fibre channel network utilizing a computer having fibre channel to PCI bus host adapters as illustrated in FIG. 4.

DESCRIPTION OF THE PREFERRED EMBODIMENTS

The present invention provides methods and apparatus for interconnecting independent fibre channel loops or fabrics. A number of particular embodiments of the present invention are disclosed herein. However, the embodiments disclosed herein are not exhaustive of all particular embodiments of the present invention. Accordingly, the present invention is not limited to the specific embodiments illustrated in the figures or disclosed herein.

In the figures, similar components and/or features have the same reference label. Various components of the same type are distinguished by following the reference label by a dash and a second label that distinguishes among the similar components. If only the first label is used, the description is applicable to any one of the several similar components.

With reference to FIG. 4, a computer system 400 is shown embodying the present invention. In particular, computer system 400 preferably comprises a processor unit 402, a memory 404, a PCI bus 406 and a PCI bridge 408. Processor unit 402 may comprise any suitable computer processor, such as an x86 processor or other CISC processor, a RISC-based processor, or the like. Furthermore, memory 404 may comprise any suitable computer memory configuration, such as DRAM, SRAM, flash memory or a hard disk drive. Furthermore, memory 404 may be configured as physical memory, cache memory, or a combination of both. Memory 404 preferably is connected to processor unit 402 via a bus 410. Bus 410 may comprise a processor bus, a cache bus, a memory bus, or a combination of any or all of these.

PCI bus 406 preferably comprises a typical peripheral component interconnect (PCI) bus currently known in the art. PCI bus 406 preferably is connected to processing unit 402 and in a particular, bus 410 via PCI bridge 408.

As one skilled in the art will appreciate, PCI bus 406 preferably comprises a standard PCI bus which supports full bus mastering, allowing devices connected to PCI bus 406 to communicate directly with other devices connected to PCI bus 406 without the need for processing unit 402 to control the communications on the bus. In this manner, the PCI bus supports arbitration circuitry and protocols which allow bus mastering or independent I/O control for each device on the bus, simultaneously. The arbitration circuitry and protocols are configured to ensure that all devices on the bus can communicate without any one device locking out any other device. Similarly, the PCI bus mastering configuration allows any given device to use the full bus throughput if no other device is transferring data.

In accordance with one embodiment of the present invention, one or more fibre channel adapters 412 preferably are connected to PCI bus 406 and are configured to connect one or more fibre channel loops or fabrics 414 to computer system 400, and more particularly PCI bus 406. In addition to fibre channel adapters 412, one skilled in the art will appreciate that a variety of other peripheral expansion cards may be connected to PCI bus 406, such as video cards, sound cards, SCSI host adapters, and other suitable high speed networking cards, to name a few.

In order to facilitate the intelligent routing of I/O requests between fibre channel loops or fabrics 414, fiber channel adapters 412 preferably are configured with the intelligent input/output ($I_2O$) peer-to-peer communication architecture for controlling the routing functions. In accordance with this aspect of the present invention, the $I_2O$ protocol controls message and I/O passing between fibre channel adapters 412, thus relieving the host-processing unit 402 of interrupt-intensive I/O tasks typically required by non-intelligent routing adapters. For example, when fibre channel adapter 412-1 receives a message or I/O request from the fibre channel loop for fabric 414-1, the intelligent routing function within fibre channel adapter 412-1 determines whether the I/O request is directed to another fibre channel loop or fabric (414-2 . . . 414-N) or to the host processor 402. In accordance with this aspect of the invention, if an I/O request is directed to the local system, fibre channel adapter 412-1 will route the request to host processor unit 402 via PCI bus 406 and PCI bridge 408. The host processing unit 402 then will process the request, formulate a response and, if necessary, deliver the response back to the fibre channel adapter for transmission to the originator of the request.

Similarly, if the I/O request is directed to a device residing on another fibre channel loop or fabric (414-2 . . . 414-N), fibre channel adapter 412-1 determines the routing location for the I/O request, preferably using an internal routing table, and sends the I/O request over PCI bus 406, to the proper fibre channel adapter 412. That fibre channel adapter then will route the I/O request to the proper device on the fibre channel loop or fabric. In addition, as one skilled in the art will appreciate the local I/O routing to host processing unit 402 may be performed simultaneously with the intelligent I/O routing to and from the multiple fibre channel or loop fabrics 414. For a more detailed discussion of intelligent routing and the application of the $I_2O$ protocol, see $I_2O$ Specification, Version 1.5, published by the $I_2O$ Special Interest Group (SIG), which is incorporated herein by reference.

Referring now to FIG. 5, one embodiment of a centralized routing fibre channel network 500 is illustrated. In accordance with this particular embodiment of the present invention, network 500 preferably comprises a centralized server 502, a plurality of secondary servers or work stations 504, and a plurality of storage systems 506 preferably connected to each of the secondary servers 504. Each of secondary servers 504 preferably are connected to centralized server 502 by a fiber channel loop or fabric 508. In accordance with the illustrated embodiment, a first secondary server 504-1 is connected to centralized server 502 via a first fibre channel loop or fabric 508-1; a second secondary server 504-2 is connected to centralized server 502 via a second fibre channel fabric or loop 508-2; and a third secondary server 504-3 is connected to centralized server 502 via a third fiber channel fabric or loop 508-3.

Each of the fiber channel loops or fabrics 508 preferably are connected to centralized server 502 by a fibre channel to PCI bus adapter 512. Similarly, the fibre channel loops or fabrics 508 are connected to each of the secondary servers 504 by a fiber channel to PCI bus adapter 514. In accordance with a preferred embodiment of the present invention, fibre channel to PCI bus adapters 512 preferably include intelligent I/O ($I_2O$) capabilities, as discussed above with reference to FIG. 4. Similarly, fibre channel to PCI bus adapter 514 also may include $I_2O$ capabilities, depending on the necessity and configuration of secondary servers 504. That is, if secondary servers 504 do not include other network connections or peripheral devices, adapters 514 probably do not need $I_2O$ capabilities. Therefore, adapters 514 may be configured with or without $I_2O$.

Storage systems 506 preferably are connected to each of the secondary servers 504 via a private I/O bus connection 510. I/O bus connection 510 may comprise fibre channel, SCSI, PCI, Universal Serial bus, fire wire, ethernet, or other suitable high speed connection. In accordance with the illustrated embodiment, a first storage system 506-1 preferably is connected to first secondary server 504-1 via I/O connection 510-1; a second storage system 506-2 preferably is connected to second secondary server 504-2 I/O via connection 510-2; and a third storage system 506-3 preferably is connected to third secondary server 504-3 via I/O connection 510-3.

Each of the I/O connections 510 preferably are connected to the secondary servers 504 using suitable adapters 516. Similarly, I/O connections 510 preferably are connected to each of the storage systems 506 via adapters 518. Adapters 518 preferably are configured to operate with storage systems. Adapters 516, 518 may be fibre channel adapters, SCSI adapters or the like, depending on the type of connection 510 used. As one skilled in the art will appreciate, adapters 516, 518 may be configured with or without the $I_2O$ capabilities, depending on the particular need for intelligent routing in that particular configuration.

In addition, while network 500 is illustrated as having only servers 502, 504 and storage systems 506, one skilled in the art will appreciate that network 500 may include a number of different devices connected to each fibre channel or private I/O bus connection. For example, each fibre channel or private I/O bus connection may comprise a number of servers, storage systems, work stations and other peripheral devices. Thus, the present invention is not limited to the embodiment illustrated in FIG. 5 and described herein.

Still referring to FIG. 5, a method of routing I/O requests from one of the secondary servers 504 to other secondary servers 504, non-attached storage systems 506, and/or centralized server 502 will now be discussed. In accordance with this aspect of the invention, if, for example, first secondary server 504-1 needs to access data stored on first storage system 506-1, server 504-1 issues an I/O request and passes it across private I/O bus connection 510-1 to first storage system 506-1 for processing. However, if first secondary server 504-1 needs to access data on storage systems 506-2, 506-3, secondary servers 504-2, 504-3, or centralized server 502, secondary server 504-1 preferably issues an I/O request and sends it over first fibre channel loop or fabric 508-1 to centralized server 502. In accordance with this aspect of the invention, fibre channel to PCI bus adapter 512-1 preferably is an intelligent adapter configured with $I_2O$ routing capabilities. Thus, fibre channel adapter 512-1 receives the I/O request and determines to which device in network 500 the I/O request is to be passed. For example, if the I/O request is directed to second storage system 506-2, fibre channel adapter 512-1 will pass the I/O request across the PCI bus to fibre channel to PCI bus adapter 512-2. Fibre channel adapter 512-2 then will pass the I/O request across second fibre channel fabric or loop 508-2 to secondary server 504-2. Secondary server 504-2 then will direct the I/O request to second storage system 506-2 via private I/O bus connection 510-2 (i.e., fibre channel, SCSI or other similar connection). If the I/O process generates a response, the response will pass back to the originating server 504-1 via the same path. As discussed in more detail below, to determine which device on network 500 the I/O request is to be passed, the intelligent fibre channel adapter preferably will look up the destination address of the destination device in its routing table, and then will pass the I/O request across the PCI bus to the appropriate adapter as determined by the destination address in the routing table.

Referring now to FIG. 6, a second embodiment of a centralized routing fibre channel network 600 is illustrated. In accordance with this particular embodiment of the present invention, network 600 is similar to network 500 except that secondary servers 604 and storage systems 606 are connected to the same fibre channel loop or fabric 608. That is, in accordance with the illustrated embodiment, first secondary server 604-1 and first storage system 606-1 preferably are connected to centralized server 602 via first fibre channel or loop 608-1. Similarly, second secondary server 604-2 and second storage system 606-2 preferably are connected to centralized server 602 via second fibre channel or loop 608-2, and third secondary server 604-3 and third storage system 606-3 preferably are connected to centralized server 602 via third fibre channel or loop 608-3. With this particular configuration, the need for secondary servers 604 to be involved in requests from centralized server 602 to storage systems 606 is eliminated. The centralized server 602 can access storage systems 606 directly over fibre channels 608 without first passing through secondary servers 604, as is required in network 500.

As with fibre channel loops or fabrics 508 in network 500, fibre channel loops or fabrics 608 in network 600 preferably are connected to the PCI bus of centralized server 602 via fibre channel to PCI bus adapters 612, which preferably have $I_2O$ capabilities. Similarly, fibre channel loops or fabrics 608 preferably are connected to the PCI buses of secondary servers 604 via fibre channel to PCI bus adapters 614, and fibre channel loops or fabrics 608 preferably are connected to the storage systems 606 via fibre channel adapters 618. Fibre channel adapters 618 may be the same as fiber channel adapters 612 and/or 614, or alternatively, fibre channel adapters 618 may be configured specifically for use with storage systems. Similarly, in accordance with the illustrated embodiment fibre channel adapters 614 and 618 may be configured with or without the $I_2O$ capabilities. In accordance with a preferred embodiment of the present invention, adapters 614 have I$_2$O capabilities, while adapters 618 do not have I$_2$O capabilities.

Still referring to FIG. 6, a method of routing I/O requests from one of the secondary servers 604 to other secondary servers 604, non-attached storage systems 606, and/or centralized server 602 will now be discussed. In accordance with this aspect of the invention, if first secondary server 604-1 needs to access data on any of the storage systems 606, secondary servers 604-2, 604-3, or centralized server 602, secondary server 604-1 preferably issues an I/O request and sends it to fibre channel to PCI bus adapter 614-1. Adapter 614-1 then determines if the I/O request of destined for first storage system 606-1 or the other storage systems 606-2, 606-3, the other secondary servers 604-2, 604-3 or centralized server 602. If the I/O request is destined for first storage system 606-1, adapter 614-1 preferably routes the I/O request over first fibre channel 608-1 to first storage system 606-1, and in particular, adapter 618-1 connecting first storage system 606-1 to first fibre channel 608-1. After receiving the I/O request, first storage system 606-1 processes the I/O request, and if necessary, sends a response back to first secondary server 604-1 via fibre channel 608-1.

In accordance with a further aspect of the present invention, if the I/O request is destined for one of the other secondary servers 604-2, 604-3, one of the other storage systems 606-2, 606-3, or centralized server 602, adapter 614-1 preferably routes the I/O request over first fibre channel 608-1 to centralized server 602, and in particular first fibre channel to PCI bus adapter 612-1. In accordance with this aspect of the invention, fibre channel to PCI bus adapter 612-1 preferably is an intelligent adapter configured with I$_2$O routing capabilities. Thus, fibre channel adapter 612-1 receives the I/O request and determines to which device in network 600 the I/O request is to be passed. For example, if the I/O request is directed to second storage system 606-2, fibre channel adapter 612-1 will pass the I/O request across the PCI bus to fibre channel to PCI bus adapter 612-2. Fibre channel adapter 612-2 then will pass the I/O request across second fibre channel fabric or loop 608-2 to second storage system 606-2 for processing. If the I/O process generates a response, the response will pass back to the originating server 604-1 via the same path. As one skilled in the art will appreciate, the process of sending an I/O request to the other devices on network 600 will be the same as that described herein with reference to second storage system 606-2.

Referring now to FIG. 7, a distributed routing fibre channel network 700 is illustrated. In accordance with this particular embodiment of the present invention, network 700 preferably comprises a plurality of servers 702 connected together via a common fibre channel loop or fabric 706. Each server 702 preferably is connected to fibre channel 706 via a fibre channel to PCI bus adapter 712. That is, in accordance with the illustrated embodiment, a first fibre channel to PCI bus adapter 712-1 connects the PCI bus of a first server 702-1 to fibre channel 706; a second fibre channel to PCI bus adapter 712-2 connects the PCI bus of a second server 702-2 to fibre channel 706; and a third fibre channel to PCI bus adapter 712-3 connects the PCI bus of a third server 702-3 to fibre channel 706. Preferably, fibre channel to PCI bus adapters 712 include I$_2$O intelligent routing capabilities.

In accordance with another particular aspect of the embodiment illustrated in FIG. 7, each of the servers 702 preferably further comprise a storage system 704 connected thereto via a private I/O bus connection 708. Private I/O bus connection 708 may comprise any high speed bus connection, such as a fibre channel, SCSI, USB, firewire, ethernet, or the like. As with the network 500 described above, high speed connections 708 are connected to servers 702 via PCI bus adapters 716, and connections 708 are connected to storage systems 704 via adapters 718. Adapters 716 and 718 may be configured with or without I$_2$O capabilities.

Still referring to FIG. 7, a method of routing I/O requests from one of the servers 702 to other of the servers 702, or storage systems 704 will now be discussed. In accordance with this aspect of the present invention, if, for example, first server 702-1 needs to access data on first storage system 704-1, server 702-1 preferably issues an I/O request and sends it over private I/O bus connection 708-1 to storage system 704-1. Storage system 704-1 then will receive the I/O request, process the request and, if necessary, transmits a response back to server 702-1 via private I/O bus connection 708-1.

In accordance with a further aspect of the present invention, if the I/O request from first server 702-1 is destined for one of the other servers 702-2, 702-3 or one of the other storage systems 704-2, 704-3, server 702-1 preferably passes the I/O request to first fibre channel to PCI bus adapter 712-1, which then determines the proper routing path for the I/O request. Adapter 712-1 then preferably passes the I/O request over fibre channel 706 to the proper server destination. For example, if the I/O request is destined for second server 702-2 or second storage system 704-2, the I/O request first passes to second fibre channel to PCI bus adapter 712-2 connected to the PCI bus of server 702-2. Adapter 712-2 receives the I/O request and determines whether it is destined for the server 702-2 or storage system 704-2. If destined for the server, adapter 712-2 will pass the I/O request to the server microprocessor via the PCI bus. However, if the I/O request is destined for second storage system 704-2, adapter routes the I/O request to adapter 716-2 via the PCI bus in server 702-2. Adapter 716-2 then routes the I/O request to second storage system 704-2 via connection 708-2. As one skilled in the art will appreciate, once either server 702-2 or storage system 704-2 processes the I/O request, they will route a response back to the initiating device via the same path from which the I/O request was received. In addition, the process of sending an I/O request to third server 702-3 or third storage system 704-3 is the same as that described herein with reference to second server 702-2 and second storage system 704-2.

Referring now to FIGS. 8 and 9, a second embodiment of a distributed routing fibre channel network 800 is illustrated. Network 800 is similar to network 700 except that instead of connecting all the servers 802 on one fibre channel connection, the servers 802 and storage systems 804 are chained together via a plurality of fibre channel connections. That is, in accordance with the illustrated embodiment, first server 802-1 and first storage system 804-1 preferably are connected or chained to second server 802 via a first fibre channel fabric or loop 806-1. First server 802-1 also may be connected to other devices via a fibre channel connection 806-4. Similarly, second server 802-2 and second storage system 804-2 preferably are chained to third server 802-3 via second fibre channel or loop 806-2, and third server 802-3 and third storage system 804-3 preferably are chained to one or more other server devices via third fibre channel or loop 806-3. As illustrated in FIG. 8, the chain of servers, storage systems and other devices may continue on, so that a large number of devices are chained together.

In accordance with an alternative embodiment of the present invention, as illustrated in FIG. 9, the servers and storage systems may be connected in a loop configuration. For example, as illustrated in FIG. 9, third server 802-3 and third storage system 804-3 may be connected to a fourth server 802-4 which, in turn, is connected back to first server 802-1 in a loop configuration. However, while FIG. 9 is illustrated as having four servers 802 and four storage systems 804, network 800 may be configured with any number of devices, including servers, storage systems, workstations, and the like. In addition, by connecting the chained devices into a loop configuration, the maximum number of loops for any one I/O request is reduced from N−1 hops (N =number of servers) to N/2 hops. In addition, the ring structure has the ability to tolerate a single connection fault without loss of communication. Thus, if one line of communication goes down, the communication can be routed in the opposite direction around the ring to the proper destination.

As in networks 500, 600, and 700, each of fibre channel loops or fabrics 806 in network 800 preferably are connected to the PCI bus of servers 802 via fibre channel to PCI bus adapters 812, which preferably have $I_2O$ capabilities. Similarly, fibre channel loops or fabrics 806 preferably are connected to the storage systems 804 via fibre channel adapters 818. Fibre channel adapters 818 may be the same as fiber channel adapters 812, or alternatively, fibre channel adapters 818 may be configured specifically for use with storage systems. Similarly, in accordance with the illustrated embodiment fibre channel adapters 818 may be configured with or without the $I_2O$ capabilities.

Still referring to FIGS. 8 and 9, a method of routing I/O requests from one of the servers 802 to other servers 802, or any of the storage systems 804 will now be discussed. In accordance with this aspect of the present invention, if, for example, first server 802-1 needs to access data on any of the storage systems 804, or other servers 802-2, 802-3, server 802-1 preferably issues an I/O request and sends it to fibre channel to PCI bus adapter 812-2. Adapter 812-2 then determines if the I/O request of destined for first storage system 804-1 or the other storage systems 804-2, 804-3, or the other servers 802-2, 802-3. If the I/O request is destined for first storage system 804-1, adapter 812-2 preferably routes the I/O request over first fibre channel 806-1 to first storage system 804-1, and in particular, adapter 818-1 connecting first storage system 804-1 to first fibre channel 806-1. After receiving the I/O request, first storage system 804-1 processes the I/O request, and if necessary, sends a response back to first server 802-1 via fibre channel 806-1.

In accordance with a further aspect of the present invention, an I/O request from one of the devices on network 800 may be destined for a device only one hop away, or the I/O request may be destined for one or more devices a plurality of hops away. For example, as illustrated in FIG. 9, an I/O request from server 802-1 may be destined for servers 802-2 or 802-4, or storage system 804-1 or 804-4, all only one hop away. Similarly, storage systems 804-2 and 804-3 and server 802-3 are all multiple hops away from server 802-1. That is, to access data on storage systems 804-2, 804-3 or server 802-3, the I/O request first passes through one or more devices. For example for an I/O request destined for storage system 804-3, the I/O request will be routed by adapter 812-2 from server 802-1 over fibre channel 806-1 to server 802-2 and, in particular, fibre channel to PCI bus adapter 812-3. Adapter 812-3 then will receive the I/O request, look-up the route for the I/O request destination in its routing table and determine that the route to storage system 804-3 is through adapter 812-4. It will then pass the I/O request over the PCI bus in server 802-2 to adapter 812-4. Adapter 812-4 then will pass the I/O request over fibre channel 806-2 to server 802-3 and, in particular, fibre channel to PCI bus adapter 812-5. Adapter 812-5 then will pass the I/O request over the PCI bus of 802-3 to adapter 812-6, which in turn will pass the I/O request to storage system 804-3 via fibre channel 806-3. Storage system 804-3 then can process the I/O request and pass a response, if necessary, back to server 802-1 either via the same path from which it came, or continuing the response around the loop to the server. That is, instead of passing the response back through servers 802-3 and 802-2, storage system 804-3 can pass the I/O request through server 802-4 and then on to server 802-1. Also, while the forward path of the I/O request was described as passing through servers 802-2 and 802-3, one skilled in the art will appreciate that server 802-1 could have passed the I/O request over fibre channels 806-4 and 806-3, to storage system 804-3. In accordance with this aspect of the invention, fibre channel to PCI bus adapters 812 preferably include the ability to determine the quickest or shortest route to the proper destination, and then pass the I/O request along that route.

As mentioned above, fibre channel to PCI bus adapters preferably have intelligent routing capabilities. In accordance with this aspect of the invention, in order to adequately route I/O requests from one device to other devices on the same fibre channel network or other independent fibre channel networks, the fibre channel to PCI bus adapters need to know the proper routing locations for each I/O request. Thus, when an adapter is powered on, a loop initialization sequence is initiated. All fibre channel to PCI bus adapters, as well as other suitable fibre channel adapters are initialized on the network. This initialization process includes the assignment of port numbers to each adapter, as well as the construction and propagation of routing tables to the adapters.

In order to properly initialize each adapter, each adapter is assigned a port number and suitable buffer credits. Typically, each connection to a fibre channel fabric or loop has a unique port number. The fibre channel standard loop initialization process (LIP) performs this function. However, as one skilled in the art will appreciate, the LIP typically assigns the fibre channel "off-loop" connection with port number 0. That is, the port that connects the fibre channel loop or fabric to the routing switch, which is configured to connect the particular loop or fabric to other fibre channel loops of fabrics, is assigned port number 0. The problem with the standard LIP process is that many of the fibre channel connections in accordance with the present invention are to "off-loop" devices. For example, in FIG. 8 and 9, fibre channel loop or fabric 806-1 comprises two off loop connections, server 802-1 and server 802-2. Thus, it is desirable for both fibre channel to PCI bus adapters 812-2 and 812-3 to have a 0 port number.

In accordance with one aspect of the present invention, this problem of having multiple "off-loop" connections on a single fibre channel can be resolved by assigning unique port numbers to each device on the fibre channel loop or fabric, and then assigning an alias port number of 0 to all adapters which have off-loop connections. In accordance with this aspect of the invention, the standard LIP process is executed, assigning unique port numbers to all devices on each loop. Each adapter that provides a connection to an off-loop device is aware that it has this capability, so it takes on an alias of 0 as well as the unique port number assigned by the standard LIP process. The adapter connection that typically would have been assigned 0 by the LIP process also takes on a non-zero alias. At the completion of this process, each device having an off-loop connection will have an alias of 0 as well as a unique, non-zero port number.

In order to guarantee that a link will always be available between all interfabric connection points, each adapter that provides interfabric (or off-loop) connections, (i.e., adapters having an alias port number of 0) is initialized to have a buffer credit of one between all other adapters present on the local loop which also provide interfabric connection points. This particular buffer credit assignment scheme insures that the interfabric connection adapters will have priority with respect to each other, so that communication between those devices is never compromised. Preferably, for all other devices on the loop, an assignment of 0 buffer credits is sufficient.

After the port number and buffer credit initialization process is complete, routing tables preferably are constructed and distributed to each fibre channel adapter. The routing tables define the paths which I/O requests may follow from one particular adapter to another device on a network. The routing tables give each adapter the ability to determine if traffic is destined for the local fibre channel loop or not, and if not, how to forward the traffic to reach its intended destination. In accordance with this particular aspect of the present invention, the routing tables may be created by one particular server on the network, or the routing tables may be generated by a plurality of servers.

The type of routing table information needed depends on the routing algorithm used. A variety of different algorithms may be used, for example, random, shortest hop, and least cost methods. In accordance with one embodiment of the present invention, random routing comprises sending I/O traffic in a random direction when a choice is involved. For example, in a loop configuration, such as the one illustrated in FIG. 9, if the I/O request can be sent out in multiple directions, the direction in which a particular I/O request takes is selected randomly. A benefit of the random direction method is that it is a simple method to implement and it balances the I/O traffic across the I/O network system. However, the random method typically will incur a number of unpredictable latencies since the I/O requests are not traveling the shortest or quickest paths.

In accordance with another embodiment of the present invention, the shortest hop routing algorithm may be used. In accordance with this aspect of the invention, the routing tables forwarded to each adapter preferably specifies the shortest route for an I/O request to travel from one adapter to another. The shortest routing method requires that each adapter have a global knowledge of the network topology to guarantee that the I/O requests are forwarded along the shortest (fewest number of hops) paths between originator and destination.

Finally, in accordance with a third embodiment of the present invention, the least cost algorithm may be used. In accordance with this aspect of the present invention, the routing path chosen preferably is based upon a number of factors, such as the current I/O load in the system, the bandwidth available in each connection, the shortest route, server CPU availability, and server memory, to name a few. The least cost routing algorithm also requires that each adapter have a knowledge of the network topology, but also requires that each adapter has the ability to monitor certain network parameters, such as the ones listed above.

In the simplest form, the routing table merely identifies to which adapter an I/O request should be routed if it is not intended for the local processor. If the network is configured in a loop, such as the one illustrated in FIG. 9, the request could be sent either direction and still reach its destination. For more complex algorithms, the complexity of the routing tables and the schemes used to generate them become more complex. For a more complete discussion of such algorithms and methods of developing routing tables, see, for example, Internet Engineering Task Force (IETF) Request for Comments (RFC) 1058 Routing Information Protocol (RIP), which is incorporated herein by reference.

Once the routing tables have been propagated to each adapter, the adapters use these routing tables to determine how to forward each I/O request. The methods in which the fibre channel adapters forward I/O requests is discussed above with reference to FIGS. 4–9.

In conclusion, the present invention provides methods and apparatus for interconnecting independent fibre channel loops and/or fabrics using fibre channel to PCI bus adapters having intelligent routing capabilities. While a detailed description of presently preferred embodiments of the invention have been given above, various alternatives, modifications, and equivalents will be apparent to those skilled in the art. For example, while embodiments of the present invention are shown and described herein as having only servers and storage systems in each network, one skilled in the art will appreciate that other devices may be connected to the fibre channel networks. In addition, other network configurations may be used without varying from the spirit of the invention. Therefore, the above description should not be taken as limiting the scope of the invention which is defined by the appended claims.

What is claimed is:

1. A system for interconnecting a plurality of independent fibre channels, comprising;
    a first server including a PCI bus and a fibre channel to PCI bus adapter for each one of said plurality of independent fibre channels, said adapters being configured to connect said plurality of fibre channels to said PCI bus of said first server; and
    a plurality of devices connected to said first server by one of said plurality of fibre channels, such that said first server communicates with said plurality of devices, and each one of said plurality of devices communicate with each other one of said plurality of devices across said one of said plurality of fibre channels,
        wherein said plurality of independent fibre channels communicate with each other across said PCI bus of said first server.

2. The system as recited in claim 1, wherein any one of said plurality of fibre channels is a fibre channel fabric.

3. The system as recited in claim 1, wherein any one of said plurality of fibre channels is a fibre channel arbitrated loop.

4. The system as recited in claim 1, wherein said adapters include an intelligent routing function for routing I/O's between said plurality of fibre channels.

5. The system as recited in claim 1, wherein said plurality of fibre channels are configured to communicate with said first server via said PCI bus.

6. The system as recited in claim 1, wherein said plurality of fibre channels communicate with each other and with said first server using the $I_2O$ communication protocol.

7. The system as recited in claim 1, wherein any one of said plurality of fibre channels include one or more devices connected thereto in addition to said first server, and wherein a device connected to one of said plurality of fibre channels communicates with a device connected to another one of said plurality of fibre channels across said PCI bus of said first server.

8. The system as recited in claim 7, wherein said at least one device comprises a second server including a PCI bus and a fibre channel to PCI bus adapter, and wherein said second server is connected to said any one of said plurality of fibre channels via said PCI bus and said adapter.

9. The system as recited in claim 7, wherein said at least one device comprises a storage system.

10. The system as recited in claim 8, wherein said second server includes a storage system connected thereto, and wherein said first server and any device connected to another one of said plurality of fibre channels connected to said first server communicate with said storage system through said second server.

11. The system as recited in claim 10, wherein said storage system is connected to said second server by a connection means selected from the group of connection means including SCSI, fibre channel, PCI or a network connection.

12. The system as recited in claim 1, wherein any one of said plurality of devices comprise a server including a PCI bus and a fibre channel to PCI bus adapter, and wherein said server is connected to said one of said plurality of fibre channels via said PCI bus and said adapter.

13. The system as recited in claim 1, wherein any one of said plurality of devices comprises a storage system.

14. The system as recited in claim 12, wherein said server includes a storage system connected thereto, and wherein said first server and each other one of said plurality of devices connected to said one of said plurality of fibre channels communicate with said storage system through said server.

15. The system as recited in claim 14, wherein said storage system is connected to said server by a connection means selected from the group of connection means including SCSI, fibre channel, PCI or a network connection.

16. A system for routing I/O requests in a distributed network environment, comprising;
   a plurality of servers comprising a PCI bus and first and second fibre channel to PCI bus adapters;
   a first fibre channel configured to interconnect first and second servers of said plurality of servers, said first and said second servers being connected to said first fibre channel through said first fibre channel to PCI bus adapter of each of said first and said second servers; and
   a second fibre channel configured to interconnect said second server with a third server of said plurality of servers, said second server being connected to said second fibre channel through said second fibre channel to PCI bus adapter of said second server, and said third server being connected to said second fibre channel through said first fibre channel to PCI bus adapter of said third server;
   wherein said first server communicates with said second server across said first fibre channel, said second server communicates with said third server across said second fibre channel, and said first server communicates with said third server through said second server via said first fibre channel to PCI bus adapter, said PCI bus, and said second fibre channel to PCI bus adapter of said second server.

17. The system as recited in claim 16, wherein one or more additional devices are connected to said first and said second fibre channels.

18. The system as recited in claim 17, wherein any one of said one or more additional devices comprises a server.

19. The system as recited in claim 17, wherein any one of said one or more additional devices comprises a storage system.

20. The system as recited in claim 16, further comprising a third fibre channel connected to said third server through said second fibre channel to PCI bus adapter of said third server.

21. The system as recited in claim 16, further comprising a third fiber channel connected to said first server through said second fibre channel to PCI bus adapter of said first server.

22. The system as recited in claim 20, wherein said third fibre channel is connected to said first server through said second fibre channel to PCI bus adapter of said first server, such that said first, said second and said third fibre channels connect said first, said second and said third servers in a ring configuration.

23. The system as recited in claim 20, wherein one or more additional devices are connected to said third fibre channel.

24. A method for routing I/O communications between a plurality of devices connected to a plurality of independent fibre channels, wherein said plurality of devises include a PCI bus and one or more fibre channel to PCI bus adapter, said method comprising the steps of:
   initializing each of said one or more fibre channel to PCI bus adapters of said plurality of devices by assigning one or more port numbers and buffer credits to each of said one or more adapters;
   constructing one or more routing tables which specify one or more paths which said I/O communications will follow to get from one of said plurality of devices connected to one of said plurality of independent fibre channels to another one of said plurality of devices connected to said one of said plurality of independent fibre channels or to another one of said plurality of independent fibre channels;
   distributing said one or more routing tables to said one or more fibre channel to PCI bus adapters of said plurality of devices; and
   routing I/O communications between said plurality of devices connected to said plurality of independent fibre channels in accordance with said one or more routing tables using said one or more fibre channel to PCI bus adapters and said PCI bus of said plurality of devices.

25. The method as recited in claim 24, wherein said step of assigning port numbers to said one or more fibre channel to PCI bus adapters is performed by a fibre channel standard loop initialization process.

26. The method as recited in claim 24, wherein one of said plurality of devices is a gateway device connecting one of said plurality of independent fibre channels to one or more other of said plurality of independent fibre channels, and wherein said step of assigning port numbers comprises assigning a port number of zero (0) to one or more fibre channel to PCI bus adapters which connect said gateway device to said one or more other of said plurality of independent fibre channels.

27. The method as recited in claim 26, wherein at least one of said plurality of independent fibre channels comprise at least two gateway devices, and wherein said step of assigning port numbers comprises assigning a unique port number to each of said one or more fibre channel to PCI bus adapters of said plurality of devices and assigning an alias port number of zero (0) to each of said fibre channel to PCI bus adapters which connect said gateway devices to said one or more other of said plurality of independent fibre channels.

28. The method as recited in claim 24, wherein said step of routing I/O communications between said plurality of devices uses a routing algorithm selected from the group of algorithms comprising random routing, shortest hop routing, and least cost routing.

29. The method as recited in claim 28, further comprising the step of monitoring the routing of each I/O communication to determine a preferred routing algorithm to be used to ensure an efficient delivery of each of said I/O communications in a particular fibre channel network environment.

30. A method for routing I/O communications between a plurality of devices connected to a plurality of independent fibre channels, wherein said plurality of devices include a PCI bus and one or more fibre channel to PCI bus adapters, said method comprising the steps of:

initializing each of said one or more fibre channel to PCI bus adapters of said plurality of devices by assigning one or more port numbers and buffer credits to each of said one or more adapters, assignment of port numbers to said one or more adapters being performed by a fibre channel standard loop initialization process;

constructing one or more routing tables which specify one or more paths which said I/O communications will follow to get from one of said plurality of devices connected to one of said plurality of independent fibre channels to another one of said plurality of devices connected to said one of said plurality of independent fibre channels or to another one of said plurality of independent fibre channels;

distributing said one or more routing tables to said one or more fibre channel to PCI bus adapters of said plurality of devices; and routing I/O communications between said plurality of devices connected to said plurality of independent fibre channels in accordance with said one or more routing tables using one or more fibre channel to PCI bus adapters and said PCI bus of said plurality of devices.

31. The method as recited in claim 30, wherein one of said plurality of devices is a gateway device connecting one of said plurality of independent fibre channels to one or more other of said plurality of independent fibre channels, and wherein said step of assigning port numbers comprises assigning a port number of zero (0) to one or more fibre channel to PCI bus adapters which connect said gateway device to said one or more other of said plurality of independent fibre channels.

32. The method as recited in claim 31, wherein at least one of said plurality of independent fibre channels comprise at least two gateway devices, and wherein said step of assigning port numbers comprises assigning a unique port number to each of said one or more fibre channel to PCI bus adapters of said plurality of devices and assigning an alias port number of zero (0) to each of aid fibre channel to PCI bus adapters which connect said gateway devices to said one or more other of said plurality of independent fibre channels.

33. The method as recited in claim 30, wherein said step of routing I/O communications between said plurality of devices uses a routing algorithm selected from the group of algorithms comprising random routing, shortest hop routing, and least cost routing.

34. The method as recited in claim 33, further comprising the step of monitoring the routing of each I/O communication to deter a preferred routing algorithm to be used to ensure an efficient delivery of each of said I/O communications in a particular fibre channel network environment.

35. A method for routing I/O communications between a plurality of devices connected to a plurality of independent fibre channels, wherein said plurality of devices include a PCI bus and one or more fibre channel to PCI bus adapters, said method comprising the steps of:

initializing each of said one or more fibre channel to PCI bus adapters of said plurality of devices by assigning one or more port numbers and buffer credits to each of said one or more adapters;

constructing one or more routing tables which specify one or more paths which said I/O communications will follow to get from one of said plurality of devices connected to one of said plurality of independent fibre channels to another one of said plurality of devices connected to said one of said plurality of independent fibre channels or to another one of said plurality of independent fibre channels;

distributing said one or more routing tables to said one or more fibre channel to PCI bus adapters of said plurality of devices; and routing I/O communications between said plurality of devices connected to said plurality of independent fibre channels in accordance with said one or more routing tables using one or more fibre channel to PCI bus adapters and said PCI bus of said plurality of devices, wherein one of said plurality of devices is a gateway device connecting one of said plurality of independent fibre channels to one or more other of said plurality of independent fibre channels, and wherein said step of assigning port numbers comprises assigning a port number of zero (0) to one or more fibre channel to PCI bus adapters which connect said gateway device to said one or more other of said plurality of independent fibre channels.

36. The method as recited in claim 35, wherein said step of assigning port numbers to said one or more fibre channel to PCI bus adapters is performed by a fibre channel standard loop initialization process.

37. The method as recited in claim 35, wherein at least one of said plurality of independent fibre channels comprise at least two gateway devices, and wherein said step of assigning port numbers comprises assigning a unique port number to each of said one or more fibre channel to PCI bus adapters of said plurality of devices and assigning an alias port number of zero (0) to each of said fibre channel to PCI bus adapters which connect said gateway devices to said one or more other of said plurality of independent fibre channels.

38. The method as recited in claim 35, wherein said step of routing I/O communications between said plurality of devices uses a routing algorithm selected from the group of algorithms comprising random routing, shortest hop routing, and least cost routing.

39. The method as recited in claim 38, further comprising the step of monitoring the routing of each I/O communication to determine a preferred routing algorithm to be used to ensure an efficient delivery of each of said I/O communications in a particular fibre channel network environment.

40. A method for routing I/O communications between a plurality of devices connected to a plurality of independent fibre channels, wherein said plurality of devises include a PCI bus and one or more fibre channel to PCI bus adapters, said method comprising the steps of:

initializing each of said one or more fibre channel to PCI bus adapters of said plurality of devices by assigning one or more port numbers and buffer credits to each of said one or more adapters;

constructing one or more routing tables which specify one or more paths which said I/O communications will follow to get from one of said plurality of devices connected to one of said plurality of independent fibre channels to another one of said plurality of devices connected to said one of said plurality of independent fibre channels or to another one of said plurality of independent fibre channels;

distributing said one or more routing tables to said one or more fibre channel to PCI bus adapters of said plurality of devices;

routing I/O communications between said plurality of devices connected to said plurality of independent fibre channels using a routing algorithm selected from the group of algorithms comprising random routing, shortest hop routing, and least cost routing in accordance with said one or more routing tables using one or more fibre channel to PCI bus adapters and said PCI bus of said plurality of devices; and monitoring the routing of each I/O communication to determine a preferred routing algorithm to be used to ensure an efficient delivery of each of said I/O communications in a particular fibre channel network environment.

41. The method as recited in claim 40, wherein said step of assigning port numbers to said one or more fibre channel to PCI bus adapters is performed by a fibre channel standard loop initialization process.

42. The method as recited in claim 40, wherein one of said plurality of devices is a gateway device connecting one of said plurality of independent fibre channels to one or more other of said plurality of independent fibre channels, and wherein said step of assigning port numbers comprises assigning a port number of zero (0) to one or more fibre channel to PCI bus adapters which connect said gateway device to said one or more other of said plurality of independent fibre channels.

43. The method as recited in claim 42, wherein at least one of said plurality of independent fibre channels comprise at least two gateway devices, and wherein said step of assigning port numbers comprises assigning a unique port number to each of said one or more fibre channel to PCI bus adapters of said plurality of devices and assigning an alias port number of zero (0) to each of said fibre channel to PCI bus adapters which connect said gateway devices to said one or more other of said plurality of independent fibre channels.

* * * * *